United States Patent
Rong

(10) Patent No.: US 11,960,801 B2
(45) Date of Patent: *Apr. 16, 2024

(54) METHOD FOR CALCULATING PRESSURE LOSS OF PARALLEL R-TYPE AUTOMOBILE VIBRATION DAMPER

(71) Applicant: SOUTH CHINA UNIVERSITY OF TECHNOLOGY, Guangdong (CN)

(72) Inventor: Qiang Rong, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 587 days.

This patent is subject to a terminal disclaimer.

(21) Appl. No.: 17/272,320

(22) PCT Filed: Jul. 19, 2019

(86) PCT No.: PCT/CN2019/096649
§ 371 (c)(1),
(2) Date: Feb. 28, 2021

(87) PCT Pub. No.: WO2020/042821
PCT Pub. Date: Mar. 5, 2020

(65) Prior Publication Data
US 2021/0182449 A1    Jun. 17, 2021

(30) Foreign Application Priority Data
Aug. 29, 2018    (CN) .......................... 201810998328.5

(51) Int. Cl.
*G06F 30/15*      (2020.01)
*G01M 17/04*     (2006.01)
*G06F 111/10*     (2020.01)

(52) U.S. Cl.
CPC ............. *G06F 30/15* (2020.01); *G01M 17/04* (2013.01); *G06F 2111/10* (2020.01)

(58) Field of Classification Search
CPC ...... G06F 30/15; G06F 2111/10; G01M 17/04
See application file for complete search history.

(56) References Cited

U.S. PATENT DOCUMENTS

2009/0107783 A1* 4/2009 Ota ..................... F16F 9/061
188/313
2012/0303193 A1* 11/2012 Gresser ................. B60K 16/00
903/907

FOREIGN PATENT DOCUMENTS

CN    103133588    6/2013
CN    106763450    5/2017
(Continued)

OTHER PUBLICATIONS

Shang X, Zhou H, Xie A, Zhu J. Filtering characteristics of string hydraulic pulsation attenuator. InDynamic Systems and Control Conference Oct. 11, 2017 (vol. 58295, p. V003T22A004). American Society of Mechanical Engineers. (Year: 2017).*

(Continued)

*Primary Examiner* — Chuen-Meei Gan
(74) *Attorney, Agent, or Firm* — JMB DAVIS BEN-DAVID

(57) ABSTRACT

Disclosed is a method for calculating a pressure loss of a parallel R-type automobile vibration damper. The automobile vibration damper includes a frame, a spring, an axle, a hydraulic cylinder, an upper oil tank, a piston, a lower oil tank, and a resistance adjustment section. The resistance adjustment section is composed of 4 capillaries connected in parallel and solenoid valves. The four capillaries are all coiled into an M shape. The 4 capillaries are R8, R4, R2, and R1 and are connected in series with solenoid valves $V_{R8}$, $V_{R4}$, $V_{R2}$, $V_{R1}$, respectively. Due to the viscous effect of oily liquid in the cylinder, when the oily liquid flows through the resistance adjustment section, damping can be adjusted by (Continued)

adjusting the configurations $S_{Rn}$ of the solenoid valves $V_{R8}$, $V_{R4}$, $V_{R2}$, and $V_{R1}$.

10 Claims, 2 Drawing Sheets

(56) References Cited

FOREIGN PATENT DOCUMENTS

| | | |
|---|---|---|
| CN | 109101748 | 12/2018 |
| JP | 2017142102 | 8/2017 |

OTHER PUBLICATIONS

Ding, Z.H., Aug. 2011. Structural design and damping characteristics modeling of new recycling vibrational energy hydraulic vibration damper. In Proceedings of 2011 International Conference on Electronic & Mechanical Engineering and Information Technology (vol. 4, pp. 1727-1730) IEEE (Year: 2011).*

* cited by examiner

METHOD FOR CALCULATING PRESSURE LOSS OF PARALLEL R-TYPE AUTOMOBILE VIBRATION DAMPER

CROSS-REFERENCE TO RELATED APPLICATIONS

This is the U.S. National Stage of International Patent Application No. PCT/CN2019/096649 filed on Jul. 19, 2019, which in turn claims the benefit of Chinese Patent Application No. 201810998328.5 filed on Aug. 29, 2018.

TECHNICAL FIELD

The present invention relates to the field of hydraulic automobile vibration dampers and, in particular to a method for calculating a pressure loss of a parallel R-type automobile vibration damper.

BACKGROUND

Vibration damping methods for automobiles mainly include hydraulic, pneumatic, and electromagnetic vibration damping methods. Hydraulic vibration damping method is currently the most widely used.

FIG. 1 is a schematic structural diagram of an existing parallel R-type automobile vibration damper. For the operating principle of the parallel R-type automobile vibration damper, reference may be made to a Chinese patent No. 201110448639. 2 entitled "AUTOMOBILE VIBRATION DAMPER WITH VARIABLE DAMPING THROUGH PARALLEL CAPILLARIES".

The automobile vibration damper includes a frame, a spring, an axle, a hydraulic cylinder, an upper oil tank, a piston, a lower oil tank, and a resistance adjustment section.

The resistance adjustment section is composed of 4 capillaries connected in parallel and solenoid valves. The 4 capillaries are all coiled into an M shape. The four capillaries are R8, R4, R2, and R1 and are connected in series with solenoid valves $V_{R8}$, $V_{R4}$, $V_{R2}$, and $V_{R1}$, respectively. Damping can be adjusted by adjusting the configurations $S_{Rn}$ of the solenoid valves $V_{R8}$, $V_{R4}$, $V_{R2}$, and $V_{R1}$.

The operating principle of the automobile vibration damper is that when a relative movement occurs between the frame and the axle, the piston will move up or down accordingly, during which the oily liquid in the hydraulic cylinder will pass through the resistance adjustment section between the oil port of the upper oil tank and the oil port of the lower oil tank and then flow from the upper oil tank to the lower oil tank, or from the lower oil tank to the upper oil tank.

Due to the viscous effect of the oily liquid in the cylinder, when the oily liquid flows through the resistance adjustment section, the capillaries operating in the resistance adjustment section will generate a resistance to the flowing of the oily liquid, thereby forming a resistance to the movement of the piston. The magnitude of the resistance is controlled by the capillary control system through the configurations $S_{Rn}$ of the solenoid valves, thereby realizing the resistance adjustment of the resistance adjustment section.

When controlling the resistance of the vibration damper, uncertainties exist in the control model of the control system because no proper method for calculating a pressure loss of a vibration damper can be found. How to reduce uncertainties of the control model is a problem faced by the vibration damper industry.

SUMMARY OF THE INVENTION

An object of the present invention is to overcome the above shortcomings and deficiencies of the prior art and provide a method for calculating a pressure loss of a parallel R-type automobile vibration damper, so as to reduce uncertainties of a control model.

The present invention is realized through the following technical solutions:

A method for calculating a pressure loss of a parallel R-type automobile vibration damper is provided. The automobile vibration damper includes a frame 11, an axle 17 and a hydraulic cylinder 13. A spring 12 is disposed between the frame 11 and the axle 17;

An upper end of the hydraulic cylinder 13 is connected to the frame 11 through a piston rod of the hydraulic cylinder, and a lower end of the hydraulic cylinder 13 is connected to the axle 17. A piston 15 in the hydraulic cylinder 13 separates the hydraulic cylinder 13 into an upper oil tank 14 and a lower oil tank 16.

A pipeline between oil delivery ports of the upper oil tank 14 and the lower oil tank 16 is connected with a resistance adjustment section. That is, an oil delivery port D of the resistance adjustment section is connected to an oil delivery port A of the upper oil tank 14, and an oil delivery port C of the resistance adjustment section is connected to an oil delivery port B of the lower oil tank 16.

The method for calculating a pressure loss of a parallel R-type automobile vibration damper includes the following steps:

(1) determining a value range of i;
(2) calculating flow resistances $R_{fRi}$ of all capillaries in operation of the resistance adjustment section:

$$R_{fRi} = \frac{128\mu l_{Ri}}{\pi d_{Ri}^4};$$

(3) calculating a total flow resistance $R_{fRt}$ of the resistance adjustment section operating in parallel:

$$R_{fRt} = \frac{1}{\sum_i \frac{1}{R_{fRi}}};$$

and
(4) calculating a total pressure loss of the automobile vibration damper:

$$\Sigma \Delta p = R_{fRt} \cdot q_t.$$

The resistance adjustment section includes four capillaries connected in parallel.

The capillaries of the resistance adjustment section are connected in series with solenoid valves.

The four capillaries of the resistance adjustment section have the same cross-sectional area.

A ratio of lengths of the four capillaries of the resistance adjustment section is 8:4:2:1; that is, their lengths are arranged according to an 8421 binary coding rule.

The four capillaries of the resistance adjustment section have the same length.

A ratio of cross-sectional areas of the four capillaries of the resistance adjustment section is 8:4:2:1; that is, their cross-sectional areas are arranged according to an 8421 binary coding rule.

The spring 12 is a helical spring, a leaf spring or a gas spring.

The capillaries in the resistance adjustment section are all coiled into an "M" shape, an "S" shape or a helical shape.

The solenoid valves of the resistance adjustment section are also connected with a capillary control system which is used to control ON and OFF of each solenoid valve.

The operation principle of an automobile vibration damper is explained as follows:

As shown in FIG. 1;

The resistance adjustment section of the automobile vibration damper includes four capillaries R8, R4, R2, and R1. The four capillaries are respectively connected in series with solenoid valves $V_{R8}$, $V_{R4}$, $V_{R2}$, and $V_{R1}$ which control the operation thereof.

The operating principle of the automobile vibration damper is that when a relative movement occurs between the frame and the axle, the piston will move up or down accordingly, during which the oily liquid in the hydraulic cylinder 13 will pass through the resistance adjustment section between port A and port B, and then flow from the upper oil tank 14 to the lower oil tank 16 or from the lower oil tank 16 to the upper oil tank 14.

Due to the viscous effect of the oily liquid in the cylinder, when the oily liquid flows through the resistance adjustment section, the capillaries operating in the resistance adjustment section will generate a resistance to the flowing of the oily liquid, thereby forming a resistance to the movement of the piston. The magnitude of the resistance is controlled by the capillary control system changing the configurations $S_{Rn}$ of the solenoid valves of the resistance adjustment section.

Because the method for calculating a pressure loss of a parallel R-type automobile vibration damper is used when determining the configurations $S_{Rn}$, uncertainties of the vibration damper control model are reduced.

The method for calculating a pressure loss of a parallel R-type automobile vibration damper according to the present invention is further explained below:

(1) Calculation of a Pressure Loss of a Single Capillary

As shown in FIG. 2, suppose the capillary is a straight capillary placed horizontally with a length of l and an inner diameter of d (d=2R, R refers to radius); the capillary is filled with liquid with a dynamic viscosity μ for laminar flow, and the flow rate of the flowing liquid is q.

Take a section of cylinder whose axis coincides with the capillary axis in the capillary with a radius of r, wherein a liquid pressure acting on an upstream end of the cylinder is $P_1$, and a liquid pressure acting on a downstream end of the cylinder is $P_2$. When the flow is stable, according to Newton's internal friction law, the cylinder taken conforms to the following force balance equation:

$$(P_1 - P_2)\pi r^2 = -2\pi r l \cdot \mu \frac{du}{dr} \quad (1\text{-}1)$$

In the above equation, u is the velocity of the liquid. Because ($P_1-P_2$) is the pressure loss Δp of the capillary, the following equation may be obtained from equation (1-1):

$$du = -\frac{\Delta p}{2\mu l} r dr \quad (1\text{-}2)$$

Equation (1-2) is integrated to obtain:

$$u = -\int_R^r \frac{\Delta p}{2\mu l} r dr = \frac{\Delta p}{4\mu l}(R^2 - r^2) \quad (1\text{-}3)$$

Equation (1-3) shows that when the liquid moves in a laminar flow in a straight capillary, the velocity is symmetric to the center line of the cylinder and is distributed according to the parabolic law.

As shown in FIG. 2, take a micro-ring area with a thickness of dr at the radius r, and the flow rate dq passing through this micro-ring area is:

$$dq = u \cdot 2\pi r dr \quad (1\text{-}4)$$

Equation (1-4) is integrated to obtain:

$$q = \int_0^R u \cdot 2\pi r dr = \frac{\pi d^4}{128\mu l} \Delta p \quad (1\text{-}5)$$

The flow resistance $R_f$ of the capillary is defined as:

$$R_f = \frac{128\mu l}{\pi d^4} \quad (1\text{-}6)$$

The unit of the flow resistance $R_f$ is Pa·s/m³.

The following equation may be obtained from equation (1-5) and equation (1-6):

$$\Delta p = R_f q \quad (1\text{-}7)$$

Similar to Ohm's law describing the relationship among current, voltage, and resistance, equation (1-7) may also be written as:

$$q = \frac{\Delta p}{R_f} \quad (1\text{-}8)$$

(2) Calculation of a Pressure Loss of Resistance Adjustment Section with a Plurality of Capillaries Operating in Parallel As shown in FIG. 1;

Suppose the value range of i is all of the label numbers of capillaries in operation among the capillaries R1, R2, R4, and R8 of the resistance adjustment section. For example, when all the capillaries R1, R2, R4, and R8 are in operation, the value range of i is {1, 2, 4, 8}; when only R1 and R8 in the capillaries R1, R2, R4, and R8 are in operation, the value range of i is {1, 8}; and so on. Suppose the length and diameter of the capillary Ri in operation of the resistance adjustment section are $l_{Ri}$ and $d_{Ri}$ respectively. According to equation (1-6), the calculation equation of the flow resistance $R_{fRi}$ of the capillary Ri is:

$$R_{fRi} = \frac{128\mu l_{Ri}}{\pi d_{Ri}^4} \quad (2\text{-}1)$$

Suppose the pressure loss across two ends of the resistance adjustment section in operation is $\Delta p_{Rt}$, the total flow rate of the resistance adjustment section in operation is $q_t$, and the total flow resistance of the resistance adjustment section in operation is $R_{fRt}$. According to equation (1-8), the following equation is obtained:

$$q_t = \frac{\Delta p_{Rt}}{R_{fRt}} \quad (2\text{-}2)$$

Here, the pressure loss $\Delta p_{Rt}$ across two ends of the resistance adjustment section in operation is also the pressure loss across two ends of the resistance adjustment section, and may also be called the pressure loss of the resistance adjustment section. The total flow rate $q_t$ of the resistance adjustment section in operation is also the total flow rate of the resistance adjustment section. The total flow resistance $R_{fRt}$ of the resistance adjustment section in operation is the total flow resistance of the capillaries in operation of the resistance adjustment section, but not necessarily the total flow resistance of the entire resistance adjustment section.

In the resistance adjustment section, when the plurality of capillaries operate in parallel, the pressure loss of each capillary is the same, which is the pressure loss $\Delta p_{Rt}$ across two ends of the resistance adjustment section in operation. Ignoring the partial pressure loss of the capillary, the flow rate of each capillary in operation is a quotient of its pressure loss and flow resistance. The total flow rate $q_t$ of the resistance adjustment section operating in parallel is the sum of the flow rates of the capillaries operating in parallel:

$$q_t = \sum_i \frac{\Delta p_{Rt}}{R_{fRi}} \quad (2\text{-}3)$$

The following equation may be obtained by comparing equation (2-2) and equation (2-3):

$$\frac{1}{R_{fRt}} = \sum_i \frac{1}{R_{fRi}} \quad (2\text{-}4)$$

Similar to the relationship of a parallel resistance circuit, equation (2-4) may also be expressed as: when the capillaries of the resistance adjustment section operate in parallel, a reciprocal of the total flow resistance $R_{fRt}$ of the resistance adjustment section in operation is equal to the sum of the flow resistance reciprocals of the capillaries in operation of the resistance adjustment section.

From equation (2-4), the total flow resistance $R_{fRt}$ of the resistance adjustment section in operation is:

$$R_{fRt} = \frac{1}{\sum_i \frac{1}{R_{fRi}}} \quad (2\text{-}5)$$

From equation (2-2), the pressure loss of the resistance adjustment section is:

$$\Delta p_{Rt} = R_{fRt} \cdot q_t \quad (2\text{-}6)$$

(3) Calculation of a Total Pressure Loss $\Sigma \Delta p$ of a Vibration Damper As shown in FIG. 1, ignoring the pressure loss of the connecting pipeline, the total pressure loss $\Sigma \Delta p$ of the vibration damper is the pressure loss of the resistance adjustment section. The following equation may be obtained from equation (2-6):

$$\Sigma \Delta p = R_{fRt} \cdot q_t \quad (3\text{-}1)$$

Here, the total pressure loss $\Sigma \Delta p$ of the vibration damper is the pressure loss between port A of the upper oil tank and port B of the lower oil tank. The total pressure loss $\Sigma \Delta p$ of the vibration damper is also called the total pressure loss of the automobile vibration damper.

(4) Calculation Steps

Summarizing the Above Part (2) and Part (3), Steps of the Method for Calculating a pressure loss of an automobile vibration damper are as follows:

(1) determining a value range of i;

(2) calculating flow resistances $R_{fRi}$ of all capillaries in operation of the resistance adjustment section:

$$R_{fRi} = \frac{128 \mu l_{Ri}}{\pi d_{Ri}^4};$$

and (3) calculating a total flow resistance $R_{fRt}$ of the resistance adjustment section operating in parallel:

$$R_{fRt} = \frac{1}{\sum_i \frac{1}{R_{fRi}}};$$

and (4) calculating a total pressure loss of the automobile vibration damper:

$$\Sigma \Delta p = R_{fRt} \cdot q_t.$$

Compared with the prior art, the present invention has the following advantages and effects:

The present invention provides a method for calculating a pressure loss of an R-type automobile vibration damper, and achieves the purpose of reducing uncertainties of the control model, which provides a theoretical basis for improving the control quality of the vibration damper.

The present invention is also of great use for improving the design of R-type automobile vibration dampers, reducing test costs and providing positive and prominent beneficial effects for the development of modern automobile vibration damping technology.

DETAILED DESCRIPTION

The present invention will be further described in detail below in conjunction with specific embodiments.

Embodiment

Figure 1:
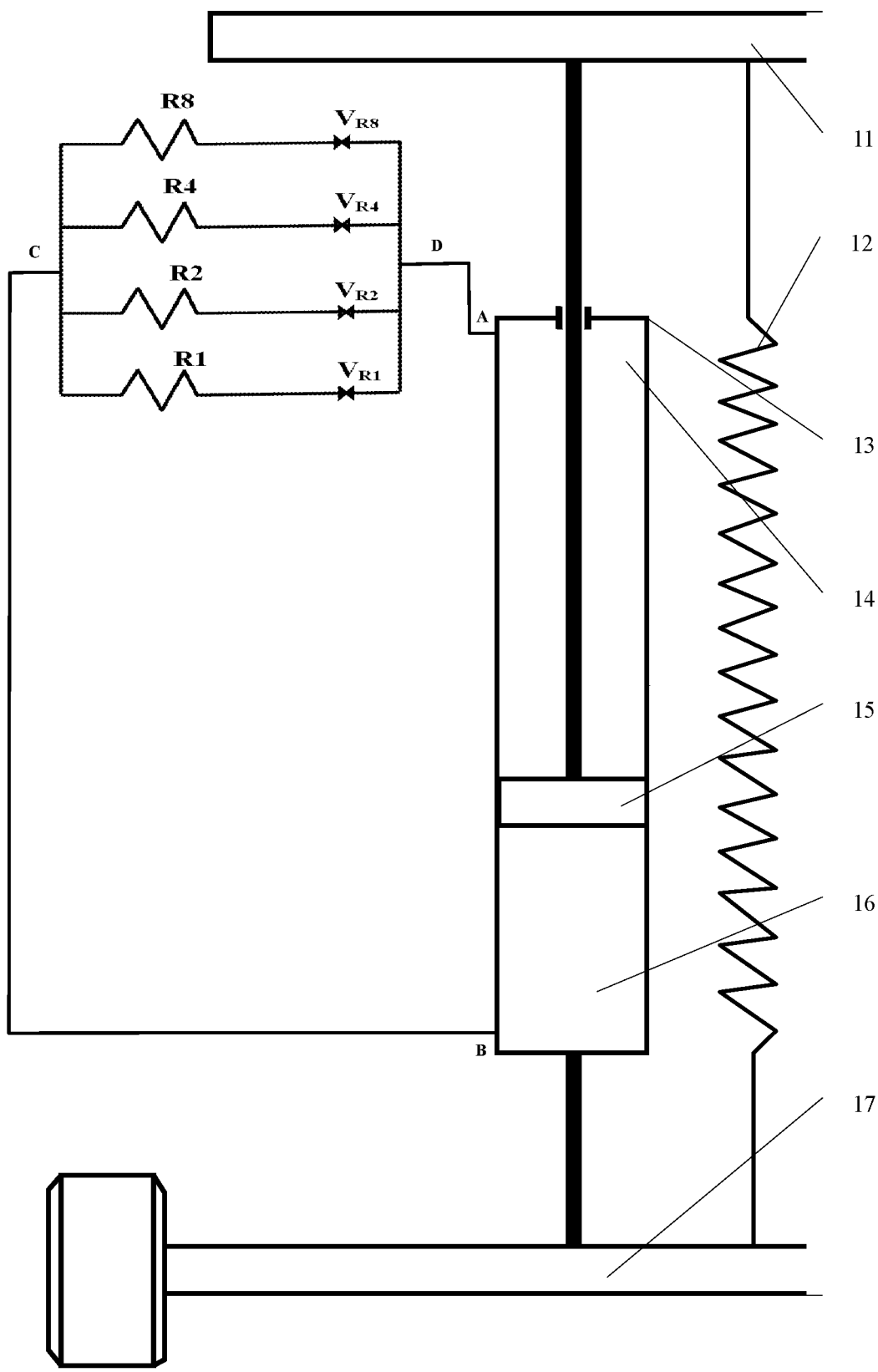
FIG. 1 is a schematic structural diagram of an existing parallel R-type automobile vibration damper.
Figure 2:
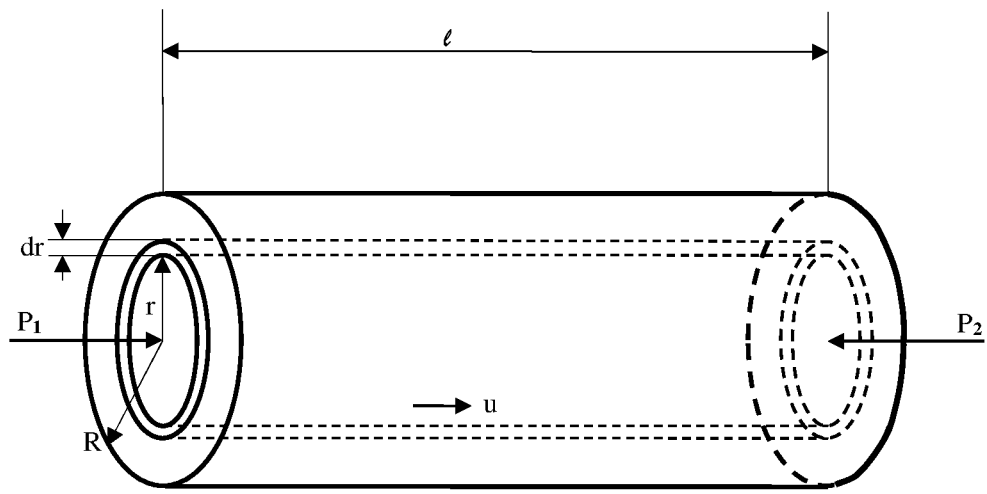
FIG. 2 is a schematic diagram of calculating a pressure loss $\Delta p$ of a single capillary in a method for calculating a pressure loss of a parallel R-type automobile vibration damper according to the present invention.

As shown in FIG. 1;

A parallel resistance adjustment section includes four capillaries R8, R4, R2, and R1. The four capillaries are respectively connected in series with solenoid valves $V_{R8}$, $V_{R4}$, $V_{R2}$, and $V_{R1}$ which control the operation thereof. A ratio of lengths of the capillaries R8, R4, R2, and R1 is 8:4:2:1. The length of the capillary R1 is $L_{R1}$. The diameters of the four capillaries are all $d_R$.

A dynamic viscosity μ of oily liquid of a vibration damper and a total flow rate q t of a resistance adjustment section of the vibration damper are known.

According to the conditions of this embodiment, size parameters of all capillaries in the resistance adjustment section may be solved first. Then, a total pressure loss $\Sigma\Delta p$ of the vibration damper under various operating conditions may be calculated according to the following steps:

(1) determining a value range of i;
(2) calculating flow resistances $R_{fRi}$ of all capillaries in operation of the resistance adjustment section:

$$R_{fRi} = \frac{128\mu l_{Ri}}{\pi d_{Ri}^4};$$

(3) calculating a total flow resistance $R_{fRt}$ of the resistance adjustment section operating in parallel:

$$R_{fRt} = \frac{1}{\sum_i \frac{1}{R_{fRi}}};$$

and (4) calculating a total pressure loss of the automobile vibration damper:

$$\Sigma\Delta p = R_{fRt} \cdot q_t.$$

In this way, a capillary control system can reduce uncertainties of a control model and improve the control quality of the vibration damper by using the method for calculating a pressure loss of a parallel R-type automobile vibration damper.

In this embodiment, because an analytical method for calculating a pressure loss is implemented, it is possible to conduct calculation easily according to various operating conditions (various value ranges of i), thereby providing a theoretical basis for reducing uncertainties of the control model.

This embodiment will be further explained with the following five points.

1. Regarding the Solenoid Valves that Control the Operation of the Capillaries of the Resistance Adjustment Section In FIG. 1, in the resistance adjustment section, operation of each capillary is controlled by a solenoid valve. For a capillary that is always in operation, it may be unnecessary to connect it with a solenoid valve. That is, the number of capillaries and the number of solenoid valves are not necessarily exactly equal.

2. Regarding the Name of "Parallel R-Type Automobile Vibration Damper"

In the name of "parallel R-type automobile vibration damper", "parallel" means that the resistance adjustment section is adjusted by parallel capillaries. "R type" refers to the manner in which the capillaries R8, R4, R2, and R1 and their corresponding solenoid valves adjust the resistance of the vibration damper under the control of the control system. Its characteristic is as follows: outside the cylinder body of the hydraulic cylinder, according to the resistance characteristics of the capillary, a plurality of (which may be four or another number) parallel (or serial) capillaries are arranged based on specific parameters (such as area, length, flow resistance, reciprocal of flow resistance, or flow resistance of hydraulic oil under certain operating condition, etc.) in accordance with certain rules (such as 8421 proportion binary coding rule, or other proportion or non-proportion rules), and the solenoid valve of the corresponding capillary is controlled by the control system to achieve the purpose of adjusting resistance.

When the vibration damper works in the above-mentioned "R-type" manner, it is also called an R-type vibration damper or R-type automobile vibration damper.

In the R-type vibration damper, the capillary does not have to be very thin. "Thin" means that a resistance will be produced when hydraulic oil flows through the capillary. That is to say, the capillary is an oil pipe or path that produces a resistance when hydraulic oil passes through.

The capillary of the R-type vibration damper may be processed into a helical shape, an "S" shape and other shapes in addition to an "M" shape. These shapes are only listed as specific shapes, and many shapes may be listed in practical applications, which can be flexibly determined according to specific requirements. The materials for making these capillary oil paths may be steel, copper, various alloys, non-metallic materials, etc. The method for making capillary oil paths may be a method of forming a tube, a method of machining, a method of 3D printing, and the like.

3. Instructions on Equations

When a Newtonian fluid is in a stable flow and laminar flow state, assuming that the capillary is a straight capillary placed horizontally, and ignoring the partial pressure loss of the capillary and the pressure loss of the connecting pipeline, the present invention derives the above calculation equations. If the actual operating conditions are significantly different from the above conditions and assumptions, the equations will have errors. Compared with the previous situation without these equations, even if the equations have errors, for the system identification of the control system, the calculation method according to the present invention can still reduce uncertainties of the control model and provide a theoretical basis for improving the control quality of the vibration damper. Of course, according to the calculation method of the present invention and additional experiments, the calculation method may also be modified, thereby further improving the control quality of the vibration damper.

4. Regarding the Spring of the Automobile Vibration Damper

In addition to a helical spring, a gas spring, an oil-gas spring and other springs may also be used as the spring in the vibration damper according to the present invention.

5. Regarding a Ratio of Flow Resistance Reciprocals of the Capillaries of the Resistance Adjustment Section Operating in Parallel In this embodiment, because the ratio of lengths of the capillaries R8, R4, R2, and R1 is 8:4:2:1, and their diameters are all $d_R$, a ratio of flow resistance reciprocals $$\frac{1}{R_{fR1}}, \frac{1}{R_{fR2}}, \frac{1}{R_{fR4}}, \text{ and } \frac{1}{R_{fR8}}$$

of the capillaries R1, R2, R4, and R8 is 8:4:2:1. In the design of the resistance adjustment section, in addition to the 8:4:2:1 arrangement, the ratio may also be 100:90:80:70 or 100:88:75:62 or 100:70:41:16, etc. Of course, the ratio may also be other ratios obtained by methods such as least squares.

As described above, the present invention can be implemented.

The implementation of the present invention is not limited by the above-mentioned embodiments, and any other changes, modifications, substitutions, combinations, and simplifications made without departing from the spirit and principle of the present invention should be equivalent replacement methods, and are included in the protection scope of the present invention.

What is claimed is:

1. A method for calculating a pressure loss of a parallel R-type automobile vibration damper, the automobile vibration damper comprising a frame (11), an axle (17) and a hydraulic cylinder (13), wherein a spring (12) is disposed between the frame (11) and the axle (17);

an upper end of the hydraulic cylinder (13) is connected to the frame (11) through a piston rod of the hydraulic cylinder (13), and a lower end of the hydraulic cylinder (13) is connected to the axle (17); and a piston (15) in the hydraulic cylinder (13) separates the hydraulic cylinder (13) into an upper oil tank (14) and a lower oil tank (16); and a pipeline between oil delivery ports of the upper oil tank (14) and the lower oil tank (16) is connected with a resistance adjustment section; that is, an oil delivery port D of the resistance adjustment section is connected to an oil delivery port A of the upper oil tank (14), and an oil delivery port C of the resistance adjustment section is connected to an oil delivery port B of the lower oil tank (16);

characterized in that the method to improve a control quality of the automobile vibration damper comprises the following steps:

(1) determining a value range of i;

(2) calculating flow resistances $R_{fRi}$ of all capillaries in operation of the resistance adjustment section:

$$R_{fRi} = \frac{128\mu l_{Ri}}{\pi d_{Ri}^4};$$

(3) calculating a total flow resistance $R_{fRt}$ of the resistance adjustment section operating in parallel:

$$R_{fRt} = \frac{1}{\sum_i \frac{1}{R_{fRi}}};$$

and (4) calculating a total pressure loss of the automobile vibration damper:

$$\Sigma \Delta p = R_{fRt} \cdot q_t$$

(5) adjusting the resistance of the automobile vibration damper by a control system of the automobile;

wherein i is a label number of the capillaries in operation, $\mu$ is a dynamic viscosity of liquid, $l_{Ri}$ is a length of a capillary Ri in operation of the resistance adjustment section, $d_{Ri}$ is a diameter of the capillary Ri in operation of the resistance adjustment section, and $q_t$ is a total flow rate of the resistance adjustment section in operation.

2. The method for calculating a pressure loss of a parallel R-type automobile vibration damper according to claim 1, wherein the resistance adjustment section comprises four capillaries connected in parallel.

3. The method for calculating a pressure loss of a parallel R-type automobile vibration damper according to claim 2, wherein the capillaries of the resistance adjustment section are connected in series with solenoid valves.

4. The method for calculating a pressure loss of a parallel R-type automobile vibration damper according to claim 3, wherein the four capillaries of the resistance adjustment section have the same cross-sectional area.

5. The method for calculating a pressure loss of a parallel R-type automobile vibration damper according to claim 3, wherein a ratio of lengths of the four capillaries of the resistance adjustment section is 8:4:2:1; that is, their lengths are arranged in accordance with an 8421 binary coding rule.

6. The method for calculating a pressure loss of a parallel R-type automobile vibration damper according to claim 3, wherein the four capillaries of the resistance adjustment section have the same length.

7. The method for calculating a pressure loss of a parallel R-type automobile vibration damper according to claim 3, wherein a ratio of cross-sectional areas of the four capillaries of the resistance adjustment section is 8:4:2:1; that is, their cross-sectional areas are arranged in accordance with an 8421 binary coding rule.

8. The method for calculating a pressure loss of a parallel R-type automobile vibration damper according to claim 3, wherein the spring (12) is a helical spring, a leaf spring or a gas spring.

9. The method for calculating a pressure loss of a parallel R-type automobile vibration damper according to claim 1, wherein the capillaries in the resistance adjustment section are all coiled into an "M" shape, an "S" shape or a helical shape.

10. The method for calculating a pressure loss of a parallel R-type automobile vibration damper according to claim 9, wherein the solenoid valves of the resistance adjustment section are also connected with a capillary control system; and the capillary control system is configured to control ON and OFF of the solenoid valve.

* * * * *